US008762895B2

(12) United States Patent
Mehta et al.

(10) Patent No.: US 8,762,895 B2
(45) Date of Patent: Jun. 24, 2014

(54) CAMERA ZOOM INDICATOR IN MOBILE DEVICES

(71) Applicant: Google Inc., Mountain View, CA (US)

(72) Inventors: Nirav Mehta, Mountain View, CA (US); Michael Kolb, Palo Alto, CA (US); Christian Robertson, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/054,493

(22) Filed: Oct. 15, 2013

(65) Prior Publication Data
US 2014/0118563 A1 May 1, 2014

Related U.S. Application Data

(60) Provisional application No. 61/719,479, filed on Oct. 28, 2012, provisional application No. 61/882,290, filed on Sep. 25, 2013.

(51) Int. Cl.
*G06F 3/041* (2006.01)

(52) U.S. Cl.
USPC .............................. 715/863; 715/838; 715/801

(58) Field of Classification Search
USPC .......................................... 715/801, 838, 863
See application file for complete search history.

(56) References Cited

U.S. PATENT DOCUMENTS

| 2008/0168384 | A1 | 7/2008 | Platzer et al. |
| 2009/0237371 | A1 | 9/2009 | Kim et al. |
| 2010/0229130 | A1* | 9/2010 | Edge et al. ..................... 715/863 |
| 2011/0019058 | A1* | 1/2011 | Sakai et al. ............. 348/333.01 |
| 2014/0007021 | A1* | 1/2014 | Akiyama ..................... 715/863 |

FOREIGN PATENT DOCUMENTS

| EP | 2482179 A2 | 8/2012 |
| WO | 2011007264 A1 | 1/2011 |

OTHER PUBLICATIONS

International Search Report and Written Opinion of International Application No. PCT/US2013/065288, mailed Feb. 7, 2014, 10 pp.

* cited by examiner

*Primary Examiner* — Peiyong Weng
(74) *Attorney, Agent, or Firm* — Shumaker & Sieffert, P.A.

(57) ABSTRACT

A computing device is described that outputs, for display at a display device, a graphical user interface including a graphical zoom indicator associated with a zoom operation of a camera. The graphical zoom indicator includes an inner fixed circle, an outer fixed circle, and an adjustable circle. The computing device receives an indication of an input detected at an input device, and based at least in part on the indication of the input, the computing device determines an adjustment to a zoom level of the zoom operation of the camera. Based at least in part on the adjustment to the zoom level of the zoom operation of the camera, the computing device updates the graphical user interface to modify a size of the adjustable circle based at least in part on the adjustment to the zoom level of the zoom operation of the camera.

18 Claims, 5 Drawing Sheets

CAMERA ZOOM INDICATOR IN MOBILE DEVICES

This application claims the benefit of U.S. Provisional Application No. 61/719,479 filed Oct. 28, 2012, and U.S. Provisional Application No. 61/882,290 filed Sep. 25, 2013, the entire content of each of which are hereby incorporated by reference.

BACKGROUND

A computing device (e.g., a mobile phone, tablet computer, etc.) may include a camera for capturing still and/or video images. In some examples, a computing device may present a user interface at a display device (e.g., a presence-sensitive screen) from which a user can interact with the camera of the computing device. For example, the user interface may provide a live image preview of the image being captured by the camera. In some instances, the camera of the computing device may include zoom functionality to magnify the live image preview prior to capturing the live image preview as a still and/or video image.

SUMMARY

In one example, the disclosure is directed to a method that includes outputting, by a computing device, for display at a display device, a graphical user interface comprising a graphical zoom indicator associated with a zoom operation of a camera, wherein the graphical zoom indicator includes an inner fixed circle, an outer fixed circle, and an adjustable circle. The method further includes receiving, by the computing device, an indication of an input detected at an input device operatively coupled to the computing device, and determining, by the computing device, based at least in part on the indication of the input, an adjustment to a zoom level of the zoom operation of the camera. The method further includes updating, by the computing device, based at least in part on the adjustment to the zoom level of the zoom operation of the camera, the graphical user interface to modify a size of the adjustable circle based at least in part on the adjustment to the zoom level of the zoom operation of the camera.

In another example, the disclosure is directed to a computing system that includes an input device, a display device, a camera, at least one processor, and at least one module operable by the at least one processor to output, for display at the display device, a graphical user interface comprising a graphical zoom indicator associated with a zoom operation of the camera, wherein the graphical zoom indicator includes an inner fixed circle, an outer fixed circle, and an adjustable circle. The computing device further includes at least one module operable by the at least one processor to receive an indication of an input detected at the input device, and determine, based at least in part on the indication of the input, an adjustment to a zoom level of the zoom operation of the camera. The computing device further includes at least one module operable by the at least one processor to update, based at least in part on the adjustment to the zoom level of the zoom operation of the camera, the graphical user interface to modify a size of the adjustable circle based at least in part on the adjustment to the zoom level of the zoom operation of the camera.

In another example, the disclosure is directed to a computer readable storage medium including instructions that, when executed, configure one or more processors of a computing device to output, for display at a display device, a graphical user interface comprising a graphical zoom indicator associated with a zoom operation of a camera, wherein the graphical zoom indicator includes an inner fixed circle, an outer fixed circle, and an adjustable circle. The computer readable storage medium further includes instructions that, when executed, configured the one or more processors of the computing device to receive an indication of an input detected at an input device operatively coupled to the computing device, and determine, based at least in part on the indication of the input, an adjustment to a zoom level of the zoom operation of the camera. The computer readable storage medium further includes instructions that, when executed, configured the one or more processors of the computing device to update, based at least in part on the adjustment to the zoom level of the zoom operation of the camera, the graphical user interface to modify a size of the adjustable circle based at least in part on the adjustment to the zoom level of the zoom operation of the camera.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing device to present a graphical zoom indicator having an adjustable circle that changes size to graphically indicate changes to a zoom level of a camera. For example, the computing device may include a display device and a camera. The computing device may output a graphical user interface (GUI) at the display device for controlling functions, such as a zoom operation, of the camera. The computing device may detect an input at an input device operatively coupled to the computing device as a user interacts with the GUI to trigger a zoom operation of the camera. Responsive to the triggering of the zoom operation, the computing device may output, for display, a circular zoom indicator within the GUI that changes size (e.g., diameter, radius, circumference, area, etc.). The zoom indicator may change size according to adjustments being made by the computing device, based on the input, to a zoom level of the zoom operation of the camera, thereby providing a graphical indication of the current zoom level of the camera.

In this manner, the computing device may more clearly present an indication of the current status (e.g., zoom level) of the zoom operation of a camera. From the zoom indicator, a user may be able to more quickly and easily interact with the computing device to make adjustments to the current zoom level of the camera. By implementing a graphical zoom indicator according to these techniques, the computing device may receive fewer inputs from a user interacting with the computing device to adjust the zoom operation of a camera. In turn, the computing device may receive fewer false inputs from the user and, as such, perform fewer operations and consume less electrical power.

Figure 1:
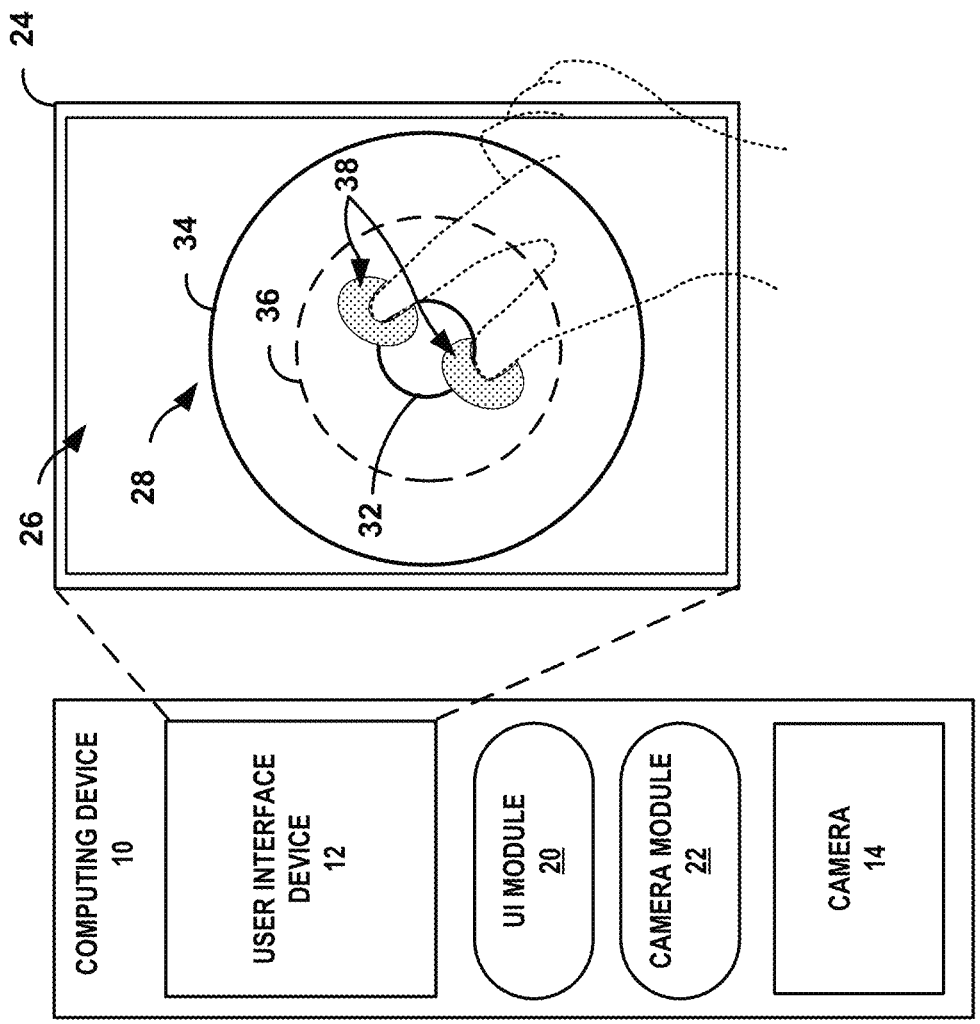
FIG. 1 is a conceptual diagram illustrating an example computing device configured to provide a user interface for controlling a zoom operation of a camera, in accordance with one or more aspects of the present disclosure.

FIG. 1 is a conceptual diagram illustrating an example computing device 10 configured to provide a user interface 24 for controlling a zoom operation of a camera, in accordance with one or more aspects of the present disclosure. In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a watch, eyewear, a glove), or any other type of mobile or non-mobile computing device suitable for controlling a camera.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 24), which may be associated with functionality provided by computing device 10. For example, UID 12 may present various user interfaces of components of a computing platform, operating system, applications, or services executing at or accessible by computing device 10 (e.g., a camera application, a camera function of a mobile operating system, etc.). A user may interact with a respective user interface to cause computing device 10 to perform operations relating to a function.

UID 12 of computing device 10 may detect two-dimensional and/or three-dimensional gestures as input from a user of computing device 10. For instance, a sensor of UID 12 may detect a user's movement (e.g., moving a hand, an arm, a pen, a stylus, etc.) within a threshold distance of the sensor of UID 12. UID 12 may determine a two or three dimensional vector representation of the movement and correlate the vector representation to a gesture input (e.g., a hand-wave, a pinch, a clap, a pen stroke, etc.) that has multiple dimensions. In other words, UID 12 can detect a multi-dimension gesture without requiring the user to gesture at or near a screen or surface at which UID 12 outputs information for display. Instead, UID 12 can detect a multi-dimensional gesture performed at or near a sensor which may or may not be located near the screen or surface at which UID 12 outputs information for display.

Computing device 10 includes camera 14 as one example of one or more cameras that may be controlled by computing device 10 to capture still or video images. Camera 14 is operatively coupled to computing device 10. For example, camera 14 may be a built-in (e.g., "internal") and/or external component of computing device 10, which computing device 10 may utilize to capture or generate still and/or video images. Camera 14 may have various controllable features, such as a zoom operation, for causing camera 14 to "zoom-in" or "zoom-out" on a particular feature of an image being captured by camera 14. The current "zoom value" of camera 14 may correspond to a factor or quantity of times that a feature in an image within a viewfinder associated with camera 14 (e.g., viewfinder 26) may be enlarged. Thus, an image with a "3×" zoom level applied to the image may appear three times larger than the feature would without any zoom level applied. Computing device 10 may utilize camera 14 to capture a visual depiction an image through a lens of camera 14 as a still or video image.

Computing device 10 may include user interface ("UI") module 20 and camera module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating in a network cloud.

Camera module 22 of computing device 10 provides functionality for controlling camera 14. For example, camera module 22 may cause computing device 10 to turn camera 14 on or off. Camera module 22 may control particular features of camera 14 based on inputs received at computing device 10. Responsive to an input received at computing device 10, camera module 22 may cause camera 14 to "snap" or capture a still image or start/stop recording of a video image. Camera module 22 may provide a command or signal to camera 14 to adjust a zoom operation of camera 14 in response to an input at computing device 10 (e.g., to cause the lens of camera 14 to "zoom-in" or "zoom-out" on an image). Camera module 22 may provide other types of commands or signals to camera 14 to control various other features of camera 14 (e.g., focus, brightness, shutter speed, etc.) in response to inputs detected by computing device 10.

UI module 20 may cause UID 12 to present user interface (e.g., user interface 24). User interface 24 includes graphical indications (e.g., elements) displayed at various locations of UID 12 related to the functionality of camera 14 being controlled by camera module 22. For example, UI module 20 may receive information from camera module 22 as camera module 22 controls camera 14. The information received from camera module 22 may include data indicative of an image being captured through a lens of camera 14 and other information related to the current status, mode of operation, or control of camera 14. UI module 20 may use the information from camera module 22 to produce an image that UID 12 presents as user interface 24.

In addition to controlling output displayed at UID 12, UI module 20 may process input received by UID 12. For example, UI module 20 may cause UID 12 to output user interface 24 or another example user interface, for display and, as a user interacts with the user interface presented at UID 12, UI module 20 may process inputs detected at UID 12 (e.g., as a user provides gesture 38 at a location of UID 12 at which user interface 24 or another example user interface is displayed). UI module 20 may relay information about the inputs detected at UID 12 to one or more associated applications, modules, operating systems, and/or computing platforms executing at or remote to computing device 10 and associated with the user interface, such as camera module 22, to cause computing device 10 to perform a function.

FIG. 1 illustrates UI module 20 causing UID 12 to present user interface 24 including viewfinder 26 which represents an image captured by camera 14. In other words, viewfinder 26 may be presented at UID 12 by computing device 10 to display or show, a live image preview of the image being captured by camera 14 as camera 14 is being controlled by camera module 22. Responsive to a user provided input at computing device 10, camera module 22 can cause the live image preview displayed in viewfinder 26 to be captured by computing device 10 as a still image or a video. In some instances, user interface 24 may include graphical elements overlaying viewfinder 26 that represent controls (e.g., particular elements at locations of UID 12) for interacting with camera 14 and/or camera module 22. For example, user interface 24 may include various graphical elements associated with controllable features or operations of camera 14 such as capturing images, starting/stopping videos, zooming, focusing, setting/changing modes, and/or configuring/modifying operational settings.

One example of a graphical element for controlling a feature of camera 14 is graphical zoom indicator 28 of user interface 24 for controlling a zoom operation or function of camera 14. Graphical zoom indicator 28 may have a plurality of concentric circles, including, for example, two fixed circles (inner fixed circle 32 and outer fixed circle 34) and adjustable circle 36. Camera module 22 may cause adjustable circle 36 to change size (e.g., diameter, radius, circumference, etc.) according to adjustments to a zoom level of the zoom operation of camera 14 being made (in response to an input) by camera module 22 to provide a graphical indication at UID 12 of the current zoom level of camera 14. Said differently, camera module 22 and UI module 20 may cause adjustable circle 36 to have a size (e.g., diameter, radius, circumference, area, etc.) that dynamically varies (e.g., increasing or decreasing) proportionate to adjustments being made to a zoom level (e.g., the zoom value) of a zoom operation of camera 14. In some examples, the current zoom value or zoom level of camera 14 may optionally be displayed as text overlaid at graphical zoom indicator 28 during zooming operations (e.g., within a region of UID 12 at which inner circle 32 is displayed).

For example, inner fixed circle 32 of graphical zoom indicator 28 may represent the minimum zoom level of camera 14. When camera module 22 determines that the current zoom level of camera 14 corresponds to the minimum zoom level (e.g., no zoom), camera module 22 and UI module 20 may cause adjustable circle 36 to have a diameter that corresponds to the diameter of inner fixed circle 32. Conversely, outer fixed circle 34 may represent the maximum zoom level of camera 14. Camera module 22 and UI module 20 may cause adjustable circle 36 to have a size that corresponds to the size of outer fixed circle 34 when the zoom level of camera 14 is at the maximum zoom level (e.g., when camera 14 cannot be zoomed further). When camera module 22 determines that the zoom level of camera 14 is between the minimum and maximum zoom levels, camera module 22 and UI module 20 may cause adjustable circle 36 to have a size that is greater than the size of inner fixed circle 32 and less than the size of outer fixed circle 34.

In the example of FIG. 1, after causing UID to output user interface 24 for display, including graphical zoom indicator 28, computing device 10 may receive an indication of an input detected at UID 12. For example, a user of computing device 10 may provide gesture 38 (e.g., "pinch in" gesture, "pinch out" gesture, multi-touch gesture, swipe gesture, etc.) at the location of UID 12 at which graphical zoom indicator 28 is displayed to trigger and/or cause camera 14 and/or camera module 22 to perform a zoom operation to expand or reduce the perspective of viewfinder 26 (e.g., reduce or increase the amount of physical area shown by viewfinder 26). Throughout the disclosure, the term pinch gesture may be used to describe either a pinch-in gesture (e.g., a gesture having multiple input points or touch positions that congregate and move closer together or a pinch-out gesture having multiple input points or touch locations separate and move further apart). In other words, as a user interacts with user interface 24, the user may provide gesture 38 to change the current zoom value of camera 14 to cause camera 14 to either zoom-in or zoom-out on the image in viewfinder 26.

UI module 20 may send information about gesture 38 to camera module 22 that camera module 22 may receive and determine, based at least in part on the indication of the input, an adjustment to the zoom level of the zoom operation of camera 14. Camera module 22 may send information to cause UI module 20 to update, based at least in part on the adjustment to the zoom level of the zoom operation of camera 14, the presentation of graphical user interface 24 at UID 12 to modify the size of adjustable circle 36 based at least in part on the adjustment to the zoom level of the zoom operation.

For example, camera module 22 may determine a size associated with gesture 38. Throughout this disclosure, the size of a gesture may describe various features of a gesture, including a length, a width, a thickness, a start location, a stop location, etc. The size of a pinch gesture may include a linear distance, an amount of area, quantity of pixels, or other unit measurement that indicates an amount of separation between two touch positions (e.g., areas of UID 12 at which two fingers contact, nearly contact, or otherwise designate a screen of UID 12 during the performance of a pinch gesture) of the gesture. For example, gesture 38 may be a pinch gesture having a size defined by a linear distance, an area, or a quantity of pixels of UID 12 that exist between two touch positions of the pinch gesture.

The size a gesture may change during input. For example, a user of computing device 10 may provide gesture 38 beginning at a first set of touch positions at UID 12 and the user may "pinch-out" gesture 38 to increase the size of gesture 38, and end providing gesture 38 at a second set of touch positions at UID 12. A greater amount of area of UID 12 may exist between each touch position in the second set of touch positions than the amount of area that exists between each touch position in the first set of touch positions. Conversely, a user of computing device 10 may provide gesture 38 beginning at a first set of touch positions at UID 12 and the user may "pinch-in" gesture 38 to decrease the size of gesture 38, and end providing gesture 38 at a second set of touch positions at UID 12. A greater amount of area of UID 12 may exist between each touch position in the first set of touch positions than the amount of area that exists between each touch position in the second set of touch positions.

Camera module 22 may compare the size of gesture 38 to the size (e.g., diameter) of inner fixed circle 32 and outer fixed circle 34 to determine a zoom level associated with camera 14. Camera module 22 may adjust the current zoom level of camera 14 by an amount that is proportionate to size of gesture 38.

For instance, if gesture 38 is a pinch-out gesture, and if the size (e.g., the distance between two contact points of gesture 38) of pinch gesture 38 exceeds the diameter of inner fixed circle 32 by a particular amount, camera module 22 may set the current zoom level of camera 14 to a zoom level that exceeds the minimum zoom level of camera 14 (e.g., greater than no zoom) by an amount of zoom that is approximately proportionate to the particular amount that the separation distance of gesture 38 exceeds the diameter of inner fixed circle 32. As camera module 22 adjusts the zoom level of camera 14, camera module 22 may cause UI module 20 to update the presentation of adjustable circle 36 at UID 12 to have a size (e.g., diameter) that corresponds to the adjusted zoom level of camera 14.

For instance, as the size or separation distance of gesture 38 may expand beyond the diameter of inner fixed circle 32, camera module 22 may increase the zoom level of camera 14, and expand the diameter of adjustable circle 36, until the zoom level reaches the maximum zoom level of camera 14 and the diameter of adjustable circle 36 corresponds to the diameter of outer fixed circle 34. Conversely, gesture 38 may be a pinch gesture having a size or separation distance that is greater than the diameter of inner fixed circle 32. If the size of gesture 38 shrinks to within the diameter of inner fixed circle 32. In other words, camera module 22 may decrease the zoom level of camera 14 as the size of gesture 38 shrinks down closer to the size (e.g., diameter) of inner fixed circle 32 and cause the diameter of adjustable circle 36 to also shrink proportionately to the decrease in size of gesture 38. The size of adjustable circle 36 may not decrease beyond the size of inner fixed circle 32, for instance, when the the zoom level of camera 14 reaches the minimum zoom level of camera 14.

In some examples, camera module 22 may cause UI module 20 to include graphical zoom indicator 28 within user interface 24 in response to an input detected at UID 12 to "trigger" or "invoke" the zoom operation of camera 14. For instance, prior to detecting gesture 38, user interface 24 may not include graphical zoom indicator 28. UI module 20 may detect the start of a two finger pinch gesture (e.g., gesture 38) at a particular location UID 12 and camera module 22 may cause UI module 20 to update user interface 24 and present graphical zoom indicator 28 centered at the particular location.

Unlike other types of user interfaces relied on by other computing devices for controlling cameras (e.g., including simple zoom dials or sliding bars, with movable buttons that slide over a line or track between a minimum zoom level and a maximum zoom level), the zoom indicator according to these techniques may be configured to better convey to a user of the computing device that a camera is being zoomed (e.g., a zooming operation is being performed) and/or to better convey pertinent information regarding the zooming process of the camera. In particular, the expansion and reduction of the size of the adjustable circle provides a clear indication to of the zoom level of the camera. Said differently, the zoom indicator according to these techniques may provide an enhanced visual indication that zooming of the camera is being performed, and may enhance conveyance of information pertaining thereto. In this manner, the computing device can more clearly present an indication of the current status of the zoom operation of the camera. From the zoom indicator, a user of computing device 10 can more quickly and easily interact with the computing device to cause to make adjustments to the current zoom level of the camera. With a graphical zoom indicator according to these techniques, the computing device may receive fewer inputs from a user interacting with the computing device to adjust the zoom operation of the camera. In turn, the computing device may receive fewer false inputs from a user, and as such, perform fewer operations and consume less electrical power.

Figure 2:
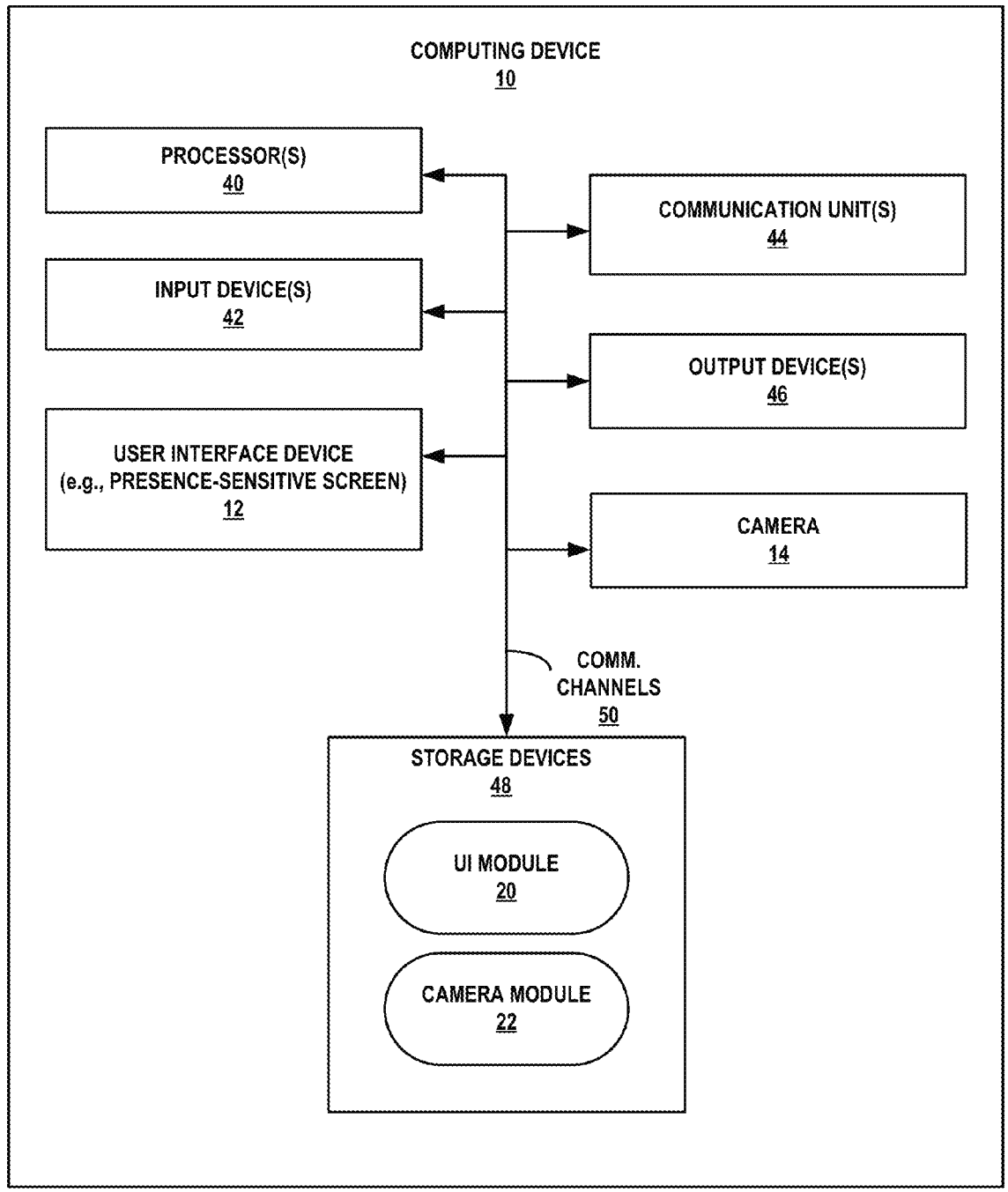
FIG. 2 is a block diagram illustrating an example computing device configured to provide a user interface for controlling a zoom operation of a camera, in accordance with one or more aspects of the present disclosure.

FIG. 2 is a block diagram illustrating an example computing device configured to provide a user interface for controlling a zoom operation of a camera, in accordance with one or more aspects of the present disclosure. FIG. 2 illustrates only one particular example of computing device 10 and many other examples of computing device 10 may be used in other instances. In the example of FIG. 2, computing device 10 may be a mobile computing device (e.g., a mobile phone, a watch, a laptop computer, etc.) or a non-portable computing device (e.g., desktop computer, a server, etc.). Computing device 10 of FIG. 2 may include a subset of the components included in example computing device 10 or may include additional components not shown in FIG. 2.

As shown in the example of FIG. 2, computing device 10 includes user interface device 12 ("UID 12"), camera 14, one or more processors 40, one or more input devices 42, one or more communication units 44, one or more output devices 46, and one or more storage devices 48. Storage devices 48 of computing device 10 also include UI module 20 and camera module 22.

Communication channels 50 may interconnect each of the components 12, 14, 20, 22, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

Like input devices 42, camera 14 of computing device 10 may receive input (e.g., still image and video input) and transmit the input received over communication channels 50 (e.g., to camera module 22). Camera module 22 may transmit commands over communication channels 50 to control operations or functions of camera 14 and may receive information over communication channels 50 from camera 14 (e.g., feedback or status information or signals) as camera 14 is being controlled.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x, y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface associated with camera 14 (such as user interfaces 24 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by modules 20 and 22 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22.

One or more processors 40 may implement functionality and/or execute instructions within computing device 10. For example, processors 40 on computing device 10 may receive and execute instructions stored by storage devices 48 that execute the functionality of UI module 20 and camera module 22. These instructions executed by processors 40 may cause computing device 10 to store information, such as image or video data captured by camera 14, within storage devices 48 during program execution. Processors 40 may execute instructions of modules 20 and 22 to cause UID 12 to capture still images or video being presented within viewfinder 26 of user interfaces 24 at UID 12. That is, modules 20 and 22 may be operable by processors 40 to perform various actions or functions of computing device 10, for instance, causing UID 12 to present user interfaces 24 at UID 12.

UI module 20 of computing device 10 may cause UID 12 to output, for display at UID 12, graphical user interface 24 including graphical zoom indicator 28 associated with a zoom operation of camera 14. Graphical zoom indicator 28 may include inner fixed circle 32 (e.g., to graphically indicate the minimum zoom level of camera 14), outer fixed circle 34 (e.g., to graphically indicate the maximum zoom level of camera 14), and adjustable circle 36 (e.g., to graphically indicate the current zoom level of camera 14).

A user of computing device 10 may provide an input at computing device 10 to adjust the zoom operation of camera 14. In some examples, the input may correspond to a location of the display device (e.g., UID 12) at which graphical zoom indicator 28 is displayed. For instance, a user may perform gesture 38 (e.g., a pinch-in or pinch-out gesture) at UID 12 to adjust the zoom operation of camera 14. UI module 20 of computing device 10 may receive an indication an input detected at UID 12 or other input device operatively coupled to computing device 10 (e.g., input devices 42) to adjust the zoom level of camera 14. For instance, a user may perform a pinch-out gesture 38 at a location of UID 12 beginning from the center of graphical zoom indicator 28 and expanding out until gesture 38 has a final separation distance the exceeds the diameter of inner fixed circle 32 and is less than the diameter of outer fixed circle 32.

Camera module 22 may receive information indicative of the indication of gesture 38 from UI module 20 and based on the information indicative of the indication of gesture 38, determine an adjustment to the zoom level of the zoom operation of camera 14. In some examples, the adjustment to the zoom level of the zoom operation of camera 14 may comprise at least one of an increase to a zoom level of camera 14 and a decrease to the zoom level of camera 14. For example, when adjusting the zoom operation of camera 14, camera module 22 may send a command over communication channels 50 to increase the zoom level of camera 14 and/or decrease the zoom level of camera 14 to cause the zoom operation of camera 14 to have a zoom level that is approximately proportionate to the final separation distance of gesture 38.

Camera module 22 may send information to UI module 20 to cause UID 12 to update user interface 24 based on the adjustment that camera module 22 makes to the zoom level of camera 14. UI module 20 may cause UID 12 to modify a size of adjustable circle 36 based at least in part on the adjustment to the zoom level of the zoom operation of camera 14. In some examples, the size of the adjustable circle may include a diameter of adjustable circle 36, a radius of adjustable circle 36, or a circumference of adjustable circle 36. For example, UI module 20 may cause UID 12 to present adjustable circle 36 having a diameter that is approximately proportionate (e.g., one-to-one) to the final separation distance of gesture 38.

In some examples, inner fixed circle 32, outer fixed circle 34, and adjustable fixed circle 36 may be concentric circles. In other words, circles 32, 34, and 36 may share a common center location when presented within user interface 24 at UID 12. The diameter of adjustable fixed circle 36 may be at least greater than or equal to the diameter of inner fixed circle 32, and the diameter of adjustable fixed circle 36 may be at least less than or equal to the diameter of outer fixed circle 34. In some examples, a size (e.g., diameter, radius, circumference, etc.) of inner fixed circle 32 may define a minimum zoom level of camera 14. In some examples, a size (e.g., diameter, radius, circumference, etc.) of outer fixed circle 24 may define a maximum zoom level of camera 14.

In other words, the size of fixed inner circle 32 and fixed outer circle 34 may graphically depict, respectively, the minimum zoom level of camera 14 and the maximum zoom level of camera 14. Camera module 22 may cause UI module 20 to present adjustable circle 36 with a size at UID 12 that graphically depicts the current zoom level of camera 14. Said differently, for higher zoom levels, camera module 20 may cause UI module 20 to present adjustable circle 36 with a greater size than when camera module 20 causes UI module 20 to present adjustable circle 36 for lower zoom levels. Camera module 22 ensure the current zoom level of camera 14 is bounded by the minimum zoom and the maximum zoom levels and may bound the size of adjustable circle 36 when presented at UID 12 to be no smaller than the size of fixed inner circle 32 and no larger than the size of fixed outer circle 34.

In some examples, adjustable circle 36 is output for display at a location of the display device located within a region of the display device defined by the inner fixed circle and the outer fixed circle. In other words, camera module 22 may cause UI module 20 to cause UID 12 to present adjustable circle 36, fixed inner circle 32 and fixed outer circle 34 as concentric circles within user interface 24 such that adjustable circle 36 appears at UID 12 within the region of UID 12 that is bounded by outer circle 34 and outside of the region of UID 12 that is bounded by inner circle 32.

In some examples, camera module 22 may first cause UI module 20 and UID 12 to output graphical zoom indicator 28 at first location of UID 12. After UI module 20 causes UID 12 to present graphical zoom indicator 28, a user of computing device 10 may provide an input (e.g., a pinch-in or pinch-out gesture) at a second location of UID 12 (e.g., a location of UID 12 that is different from the first location at which graphical zoom indicator 28 is currently being displayed). Responsive to receiving the input at the second location, camera module 22 may cause UI module 20 and UID 12 to output graphical zoom indicator 28 for display at the second location of UID 12. For example, camera module 22 may receive information about the input at the second location from UI module 20 and cause UI module 20 to re-center (e.g., move) graphical zoom indicator 28 from the first location of UID 12 to the second location of UID 12 at which the input is received. In other words, camera module 22 may cause UI module 20 and UID 12 to center graphical zoom indicator 28 at the location of UID 12 that corresponds to a location at which a user provides an input to adjust a zoom operation of camera 14.

Figure 3:
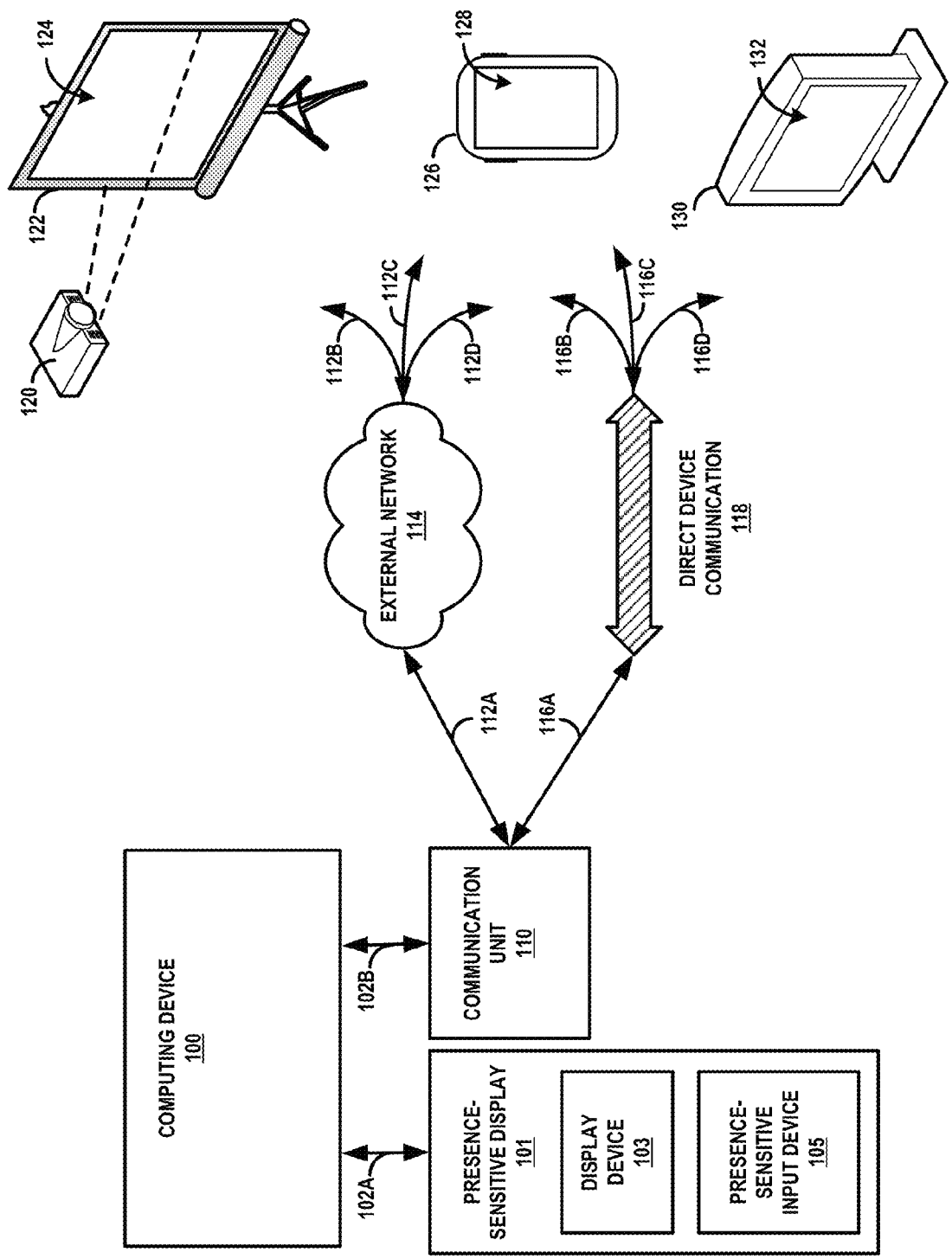
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, a rendering of content of HTML-based display data, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UID 12 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 4 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 4 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may output, for display at visual display device 130, a graphical user interface comprising a graphical zoom indicator associated with a zoom operation of a camera. The graphical zoom indicator may include an inner fixed circle, an outer fixed circle, and an adjustable circle. For example, computing device 100 may send information (e.g., data) indicative of user interface 24 to visual display device 130 over external network 114. Based on the data received over external network 114, visual display device may output user interface 24 for display.

Computing device 100 may receive an indication of an input detected at an input device operatively coupled to computing device 100. For example, a user of computing device 100 may perform a gesture at or near the screen of presence-sensitive input device 105 to cause computing device 100 to increase a zoom level associated with a camera of computing device 100. Computing device 100 may receive information related to the gesture over communication channel 102B.

Computing device 100 may determine, based at least in part on the indication of the input, an adjustment to the zoom level of the zoom operation of the camera. For example, computing device 100 may determine a size of the gesture performed by the user at or near presence-sensitive input device 105 and increase or decrease a zoom level of the camera. Computing device 100 may update, based at least in part on the adjustment to the zoom level of the zoom operation, a size of the adjustable circle based at least in part on the adjustment to the zoom level of the zoom operation. For instance, computing device 10 may output information over external network 114 to visual display device 130 indicative of an update to user interface 24 that includes a larger or smaller sized adjustable circle than the adjustable circle presented at visual display device 130, prior to receiving the indication of the input. The adjustable circle may be greater than the original adjustable circle presented at visual display device 130 to indicate an increase in the zoom level of the camera in response to the input or may be smaller than the original adjustable circle to indicate a decrease in the zoom level of the camera in response to the input.

Figure 4B:
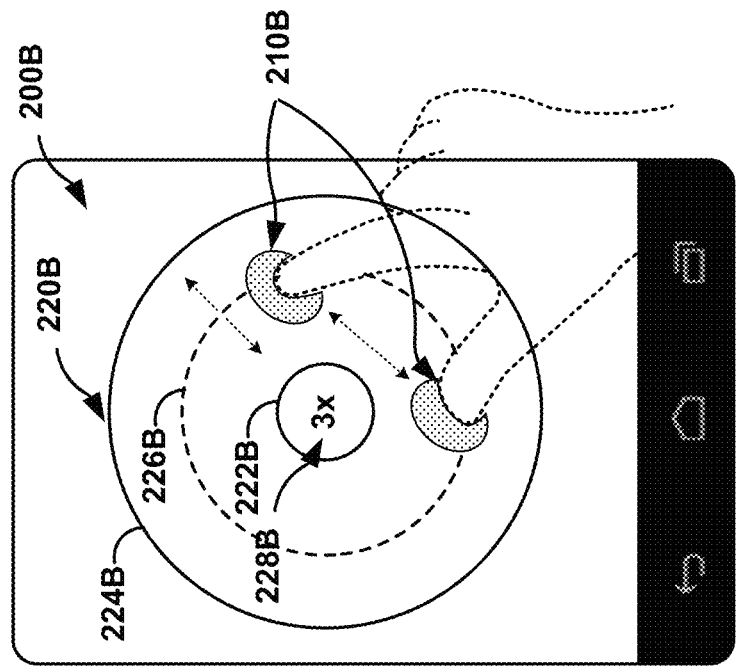
FIGS. 4A and 4B are conceptual diagram s illustrating example graphical user interfaces for controlling a zoom operation of a camera, in accordance with one or more aspects of the present disclosure.
Figure 4A:
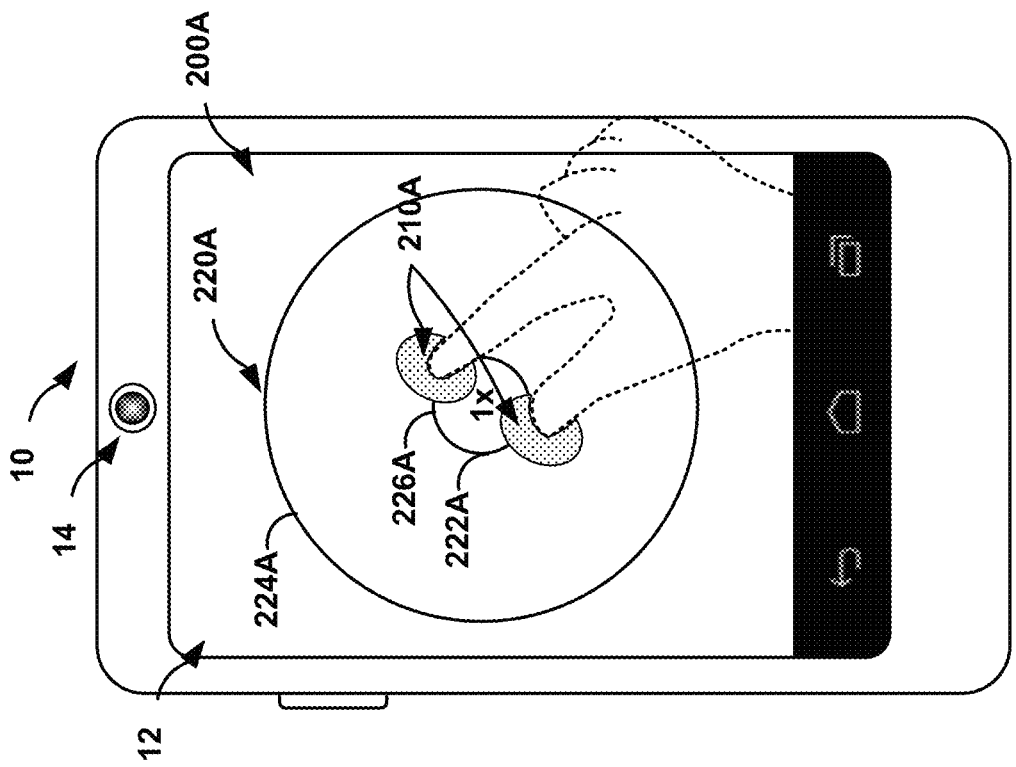

FIGS. 4A and 4B are a conceptual diagrams illustrating example graphical user interfaces for controlling a zoom operation of a camera, in accordance with one or more aspects of the present disclosure. FIGS. 4A and 4B are described below within the context of computing device 10 of FIGS. 1 and 2. For example, FIG. 4A shows that camera module 22 may cause UI module 20 of computing device 10 of FIG. 1 to output user interface 200A for display at UID 12 to present a viewfinder associated with camera 14 including a image being captured through a lens of camera 14. User interface 200A of FIG. 4A includes graphical zoom indicator 220A having concentric fixed inner circle 222A, fixed outer circle 224A, and adjustable circle 226A. Adjustable circle 226A is shown in FIG. 4A as being the same size as fixed inner circle 222A (e.g., to illustrate an instance when the current zoom level of camera 14 is at a minimum zoom level).

As shown in FIG. 4A, graphical zoom indicator 220A may provide an enhanced user experience when performing zoom operations associated with camera 14 of computing device 10. In this regard, the user may initiate or trigger a zoom operation of computing device 10 by providing input 210A (e.g., gesturing with two fingers) at a location of UID 12 at or near a location where camera module 22 causes UI module 20 and UID 12 to present graphical zoom indicator 220A. In some examples, graphical zoom indicator 220A may be displayed in response to input 210A. While input 210A may be applied (and processed as triggering zoom) anywhere within user interface 220A, in some instances, the touch positions of input 210A (e.g., locations of UID 12 nearest to where the fingers of the user are in contact with UID 12 when the user finishes input 210A) may also enable the delineation or specification of a central area or object for zooming within the viewfinder being displayed within user interface 200A (e.g., rather than simply zoom in and out, the center of the viewfinder of user interface 200A, camera module 22 may cause the viewfinder of user interface 200A to shift and re-center at the location of input 210A.

The user of computing device 10 may control the zoom operation of camera 14 by pinching-out and pinching-in his or her fingers together to, respectively, cause camera module 22 to zoom camera 14 out, or zoom camera 14 in. For example, FIG. 14B shows input 210B being provided by a user at user interface 200B. The user of computing device 10 may cause camera module 22 to zoom camera 14 out or in (thus changing the applicable zoom value of camera 14) by moving his or her fingers closer together or further apart. In other words, computing device 10 may adjust the zoom operation of camera 14 based on the size (e.g., the separation distance) of input 210B.

In response to receiving information about input 210B being detected by UID 12 from UI module 20, camera module 22 may determine the adjustment to the zoom level of the zoom operation of camera 14. Responsive to detecting an increase to a size of input 210B (e.g., the pinch-in or pinch-out gesture), camera module 22 may increase a current zoom level of camera 14. Conversely, responsive to detecting a decrease to a size of input 210B (e.g., the pinch-in or pinch-out gesture), camera module 22 may decrease a current zoom level of camera 14. Said differently, by varying the size of input 220B (e.g., the separation distance between two fingers), the user may cause camera module 22 to incrementally increase or decrease the zoom level of camera 14.

Responsive to detecting an amount of change to a size of input 210B (e.g., the pinch-in or pinch-out gesture) camera module 22 may cause UI module 20 to modify the size (e.g., the diameter) of adjustable circle 26 presented at UID 12 by an amount of size that that is proportionate to the amount of detected change to the size of the input. For example, a user may cause the size of input 210B to double in size (e.g., by pinching-out his or her fingers to span twice the distance that initially existed between his or her fingers at UID 12). By doubling the size of input 210B, camera module 22 may increase the zoom level from one zoom level (e.g., one and a half times zoom) to a second zoom level (e.g., two times zoom). If the user again, doubles the size of input 210B, camera module 22 may again, increase the zoom level of camera 14 proportionately from the second zoom level (e.g., two times zoom) to a third zoom level (e.g., two and one half times zoom). Conversely, the user may cause the size of input 210B to half in size (e.g., by pinching-in his or her fingers to spance half the distance that initially existed between his or her fingers at UID 12. By halfing the size of input 210B, camera module 22 may decrease the zoom level from one zoom (e.g., four times zoom) level to a second zoom level (e.g., two times zoom).

In some examples, adjustable circles 226A and 226B may not initially be shown. For instance, as shown in FIG. 4A, camera module 22 may refrain from causing UI module 20 to present adjustable circle 226A until, as shown in FIG. 4B, the adjustment made by camera module 22 in response to the input causes the zoom operation of camera 14 to reach a zoom level that corresponds to an adjustable circle size that exceeds the size of fixed inner circle 222B. In some instances, camera module 22 may cause the size of adjustable circle 226A and 226B to appear to change in "real-time" as a user provides an input that changes in size.

In some instances, fixed inner circle 222B and fixed outer circle 224B may correspond to the minimum and maximum zoom values, respectively, available to camera 14 of computing device 10. Accordingly, adjustable circle 226B may be configured such that it may not expand beyond fixed outer circle 224B or shrink beyond fixed inner circle 222B even if a pinch-out or pinch-in gesture expands apart or shrinks together. Similarly, camera module 22 of computing device 10 may prevent the zoom operation from increasing or decreasing a zoom value beyond a maximum or minimum zoom level once a maximum or minimum zoom level is reached. In other words, camera module 22 may stop decreasing a zoom level of camera 14 when the minimum zoom value is reached even if the user of computing device 10 continues to shrink a pinch gesture to an decreased size (e.g., by pinching his or her fingers closer together), and camera module 22 may stop increasing a zoom level of camera 14 when the maximum zoom value is reached even if the user of computing device 10 continues to expand a pinch-out gesture to an increased size (e.g., by pulling his or her fingers further apart). Nonetheless, in some instances, if camera module 22 receives information from UI module 20 that indicates the movement of an input has reversed (e.g., as a user reverses the movement of a pinch-in or pinch-out gesture), camera module 22 may resume altering the zoom level of camera 14 and the size of adjustable circle 226B accordingly.

In some instances, to further enhance the user experience during zoom operations, the current applicable zoom values may be displayed dynamically during zoom operations. For example, the current zoom value may be displayed in the middle of the inner circle 222B. In other words, camera module 22 of computing device 10 may cause UI module 20 and UID 12 to output, for display at UID 12, graphical indication 228B of a current zoom level of camera 14, within fixed inner circle 222B. For example, camera module 22 may cause UI module 20 and UID 12 to present graphical indication 228B (e.g., the text "3×") at a location of UID 12 within the region bounded by circle 222B to indicate to the user, the current zoom level of camera 14.

Figure 5:
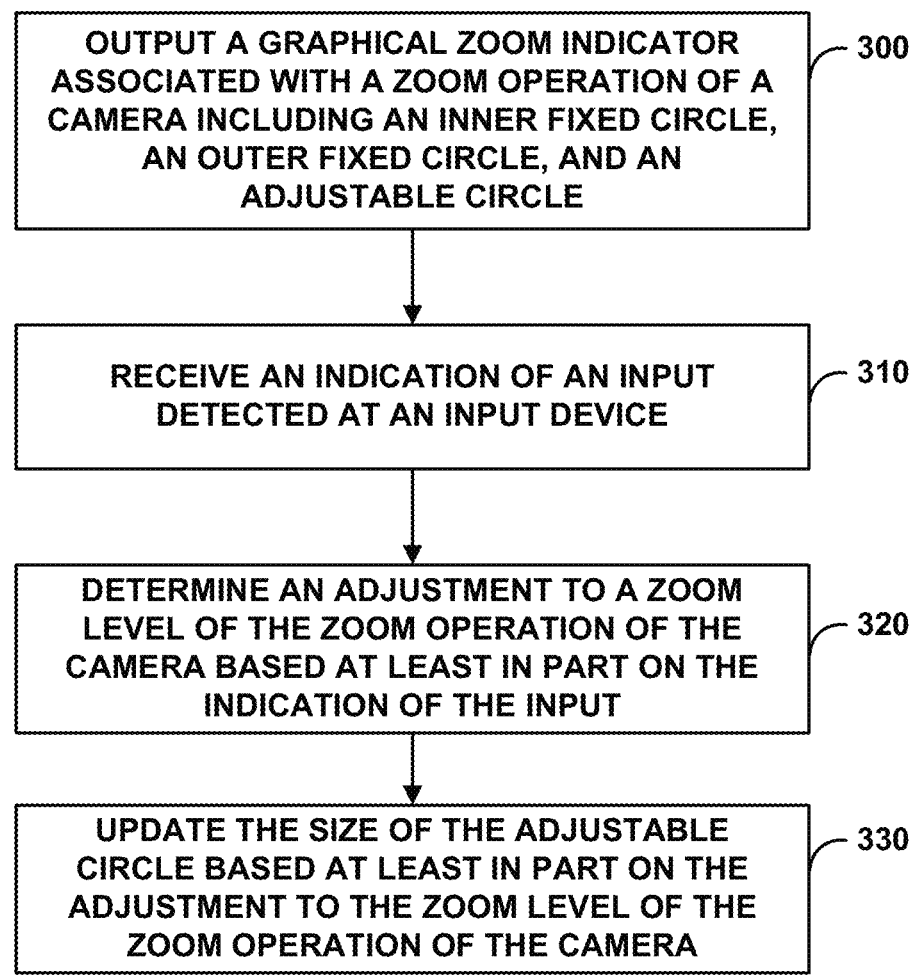
FIG. 5 is a flowchart illustrating example operations of an example computing device configured to provide a user interface for controlling a zoom operation of a camera, in accordance with one or more aspects of the present disclosure.

FIG. 5 is a flowchart illustrating example operations of an example computing device configured to provide a user interface for controlling a zoom operation of a camera, in accordance with one or more aspects of the present disclosure. The process of FIG. 5 is described below within the context of computing device 10 of FIGS. 1 and 2.

The computing device may output a graphical zoom indicator associated with a zoom operation of a camera including an inner fixed circle, an outer fixed circle, and an adjustable circle (300). For example, camera module 22 may cause UI module 20 and UID 12 to present user interface 24 including viewfinder 26 of camera 14. Responsive to an indication of an input to zoom camera 14, camera module 22 may cause UI module 20 to update the presentation of user interface 24 at UID 12 to include graphical zoom indicator 28 having inner fixed circle 32, outer fixed circle 34, and adjustable circle 36.

The computing device may receive an indication of an input detected at an input device operatively coupled to computing device 10 (310). For example, a user may provide gesture 38 (e.g., a pinch-in or pinch-out gesture) at a location of UID 12 that corresponds to the edge (e.g., the circumference) of fixed inner circle 32 and expands outward towards the circumference of fixed outer circle 34. As the user provides gesture 38, camera module 22 may receive information from UI module 20 indicative of gesture 38.

The computing device may determine an adjustment to a zoom level of the zoom operation based at least in part on the indication of the input (320). For instance, camera module 22 may increase a zoom level of camera 14 as the size of gesture 38 increases or decrease the zoom level of camera 14 as the size of gesture 38 decreases. The increase or decrease in the zoom level of camera 14 may be approximately proportionate to the increase or decrease in the size of gesture 38. In other words, as the user causes gesture 38 to grow in size, camera module 22 may increase the zoom level up-to, and including, the maximum zoom level of camera 14. Conversely, as the user causes gesture 38 to shrink in size, camera module 22 may decrease the zoom level of camera 14 down-to, and including, the minimum zoom level of camera 14.

The computing device may update the size of the adjustable circle based at least in part on the adjustment to the zoom level of the zoom operation (330). For example, with each change to the zoom level of camera 14 by camera module 22, camera module 22 may send information and/or a command to cause UI module 20 and UID 12 to update the presentation of user interface 24. The updated presentation may include adjustable circle 36 having a size that corresponds, or at least is based on, the current zoom level of camera 14. The maximum size of adjustable circle 36 may correspond to the maximum zoom level of camera 14, and also the size of fixed outer circle 34. The minimum size of adjustable circle 36 may correspond to the minimum zoom level of camera 14 and also the size of fixed inner circle 32.

In some examples, the operations described above, such as in the example of FIG. 5, may further include responsive to detecting an amount of change to a size of the input detected by the input device, modifying, by the computing device, the size of the adjustable circle by an amount of size that is proportionate to the amount of change to the size of the input. The input may include a multi-touch gesture and the size of the input is defined by a distance between two input points of the multi-touch gesture. In any of the example operations described above for determining the adjustment to the zoom level of the zoom operation of the camera, the operations described above may further include responsive to detecting an increase to a size of the input, increasing, by the computing device, the zoom level of the zoom operation of the camera. The input may include a multi-touch gesture and the size of the input is defined by a distance between two input points of the multi-touch gesture In any of the example operations described above for determining the adjustment to the zoom level of the zoom operation of the camera, the operations described above may further include responsive to detecting a decrease to a size of the input detected by the input device, decreasing, by the computing device, the zoom level of the zoom operation of the camera. The input may include a multi-touch gesture and the size of the input is defined by a distance between two input points of the multi-touch gesture. In any of the example operations described above, the inner fixed circle, the outer fixed circle, and the adjustable fixed circle may be concentric circles, wherein the diameter of the adjustable fixed circle may be greater than or equal to the diameter of the inner fixed circle, and the diameter of the adjustable fixed circle may be less than or equal to the diameter of the outer fixed circle.

In any of the example operations described above, the input may include multi-touch gesture including a pinch-in gesture and a pinch-out gesture detected by the input device, the multi-touch gesture having a size defined by a distance between two input points of the multi-touch gesture. In any of the example operations described above, the adjustment to the zoom level of the zoom operation of the camera may include at least one of an increase to the zoom level and a decrease to the zoom level of the zoom operation of the camera.

In any of the example operations described above, the graphical zoom indicator may be output for display at the display device being centered at a first location of the display device. The input described above may be detected at a location of the input device corresponding to a second location of the display device. The operations described above may further include responsive to receiving the indication of the input, outputting, by the computing device, for display at the display device, the graphical zoom indicator being centered at the second location of the display device.

In any of the example operations described above, the computing device may further output, for display at the display device, a graphical indication of a current zoom level of the camera within the inner circle. In any of the example operations described above, the adjustable circle may be output for display at a region of the display device. The region may be defined by an area outside of the inner fixed circle and an area inside the outer fixed circle.

In any of the example operations described above, a size of the inner fixed circle may define a minimum zoom level of the zoom operation of the camera, and a size of the outer fixed circle may define a minimum zoom level of the zoom operation of the camera.

In any of the example operations described above, the input may include a pinch gesture having a size, and the operations described above for determining the adjustment to the zoom level of the zoom operation of the camera may include responsive to determining that the size of the pinch gesture is greater than or equal to the diameter of the outer fixed circle, determining, by the computing device, that the zoom level of the zoom operation of the camera corresponds to a maximum zoom level.

In any of the example operations described above, the input may include a pinch gesture having a size. The operations described above for determining the adjustment to the zoom level of the zoom operation of the camera may include responsive to determining that the size of the pinch gesture is less than or equal to the diameter of the inner fixed circle, determining, by the computing device, that the zoom level of the zoom operation of the camera corresponds to a minimum zoom level.

Clause 1. A method, comprising: outputting, by a computing device, for display at a display device, a graphical user interface comprising a graphical zoom indicator associated with a zoom operation of a camera, wherein the graphical zoom indicator includes an inner fixed circle, an outer fixed circle, and an adjustable circle; receiving, by the computing device, an indication of an input detected at an input device operatively coupled to the computing device; determining, by the computing device, based at least in part on the indication of the input, an adjustment to a zoom level of the zoom operation of the camera; and updating, by the computing device, based at least in part on the adjustment to the zoom level of the zoom operation of the camera, the graphical user interface to modify a size of the adjustable circle based at least in part on the adjustment to the zoom level of the zoom operation of the camera.

Clause 2. The method of clause 1, further comprising responsive to detecting an amount of change to a size of the input detected by the input device, modifying, by the computing device, the size of the adjustable circle by an amount of size that is proportionate to the amount of change to the size of the input, wherein the input comprises a multi-touch gesture and the size of the input is defined by a distance between two input points of the multi-touch gesture.

Clause 3. The method of any of clauses 1-2, wherein determining the adjustment to the zoom level of the zoom operation of the camera further comprises responsive to detecting an increase to a size of the input detected by the input device, increasing, by the computing device, the zoom level of the zoom operation of the camera, wherein the input comprises a multi-touch gesture and the size of the input is defined by a distance between two input points of the multi-touch gesture.

Clause 4. The method of any of clauses 1-3, wherein determining the adjustment to the zoom level of the zoom operation of the camera further comprises responsive to detecting a decrease to a size of the input detected by the input device, decreasing, by the computing device, the zoom level of the zoom operation of the camera, wherein the input comprises a multi-touch gesture and the size of the input is defined by a distance between two input points of the multi-touch gesture.

Clause 5. The method of any of clauses 1-4, wherein the inner fixed circle, the outer fixed circle, and the adjustable fixed circle are concentric circles, wherein the diameter of the adjustable fixed circle is greater than or equal to the diameter of the inner fixed circle, and wherein the diameter of the adjustable fixed circle is less than or equal to the diameter of the outer fixed circle.

Clause 6. The method of any of clauses 1-5, wherein the input comprises a multi-touch gesture including a pinch-in gesture and a pinch-out gesture detected by the input device, the multi-touch gesture having a size defined by a distance between two input points of the pinch gesture.

Clause 7. The method of any of clauses 1-6, wherein the adjustment to the zoom level of the zoom operation of the camera comprises at least one of an increase to the zoom level and a decrease to the zoom level of the zoom operation of the camera.

Clause 8. The method of any of clauses 1-7, wherein the graphical zoom indicator is output for display at the display device being centered at a first location of the display device, wherein the input is detected at a location of the input device corresponding to a second location of the display device, the method further comprising responsive to receiving the indication of the input, outputting, by the computing device, for display at the display device, the graphical zoom indicator being centered at the second location of the display device.

Clause 9. The method of any of clauses 1-8, further comprising outputting, by the computing device, for display at the display device, a graphical indication of a current zoom level of the camera within the inner circle.

Clause 10. The method of any of clauses 1-9, wherein the adjustable circle is output for display at a region of the display device, the region being defined by an area outside of the inner fixed circle and an area inside the outer fixed circle.

Clause 11. The method of any of clauses 1-10, wherein a size of the inner fixed circle defines a minimum zoom level of the zoom operation of the camera, and wherein a size of the outer fixed circle defines a minimum zoom level of the zoom operation of the camera.

Clause 12. The method of any of clauses 1-11, wherein the input comprises a pinch gesture having a size, wherein determining the adjustment to the zoom level of the zoom operation of the camera comprises responsive to determining that the size of the pinch gesture is greater than or equal to the diameter of the outer fixed circle, determining, by the computing device, that the zoom level of the zoom operation of the camera corresponds to a maximum zoom level.

Clause 13. The method of any of clauses 1-12, wherein the input comprises a pinch gesture having a size, wherein determining the adjustment to the zoom level of the zoom operation of the camera comprises responsive to determining that the size of the pinch gesture is less than or equal to the diameter of the inner fixed circle, determining, by the computing device, that the zoom level of the zoom operation of the camera corresponds to a minimum zoom level.

Clause 14. A computing system comprising: an input device; a display device; a camera; at least one processor; and at least one module operable by the at least one processor to: output, for display at the display device, a graphical user interface comprising a graphical zoom indicator associated with a zoom operation of the camera, wherein the graphical zoom indicator includes an inner fixed circle, an outer fixed circle, and an adjustable circle; receive an indication of an input detected at the input device; determine, based at least in part on the indication of the input, an adjustment to a zoom level of the zoom operation of the camera; and update, based at least in part on the adjustment to the zoom level of the zoom operation of the camera, the graphical user interface to modify a size of the adjustable circle based at least in part on the adjustment to the zoom level of the zoom operation of the camera.

Clause 15. The computing system of clause 14, wherein the at least one module is further operable by the at least one processor to responsive to detecting an amount of change to a size of the input detected by the input device, modifying, by the computing device, the size of the adjustable circle by an amount of size that is proportionate to the amount of change to the size of the input, wherein the input comprises a multi-touch gesture and the size of the input is defined by a distance between two input points of the multi-touch gesture.

Clause 16. The computing system of any of clauses 14-15, wherein the at least one module is further operable by the at least one processor to responsive to detecting an increase to a size of the input detected by the input device, increasing, by the computing device, the zoom level of the zoom operation of the camera, wherein the input comprises a multi-touch gesture and the size of the input is defined by a distance between two input points of the multi-touch gesture.

Clause 17. The computing system of any of clauses 14-16, wherein the at least one module is further operable by the at least one processor to responsive to detecting a decrease to a size of the input detected by the input device, decreasing, by the computing device, the zoom level of the zoom operation of the camera, wherein the input comprises a multi-touch gesture and the size of the input is defined by a distance between two input points of the multi-touch gesture.

Clause 18. The computing system of any of clauses 14-17, wherein the inner fixed circle, the outer fixed circle, and the adjustable fixed circle are concentric circles, wherein the diameter of the adjustable fixed circle is greater than or equal to the diameter of the inner fixed circle, and wherein the diameter of the adjustable fixed circle is less than or equal to the diameter of the outer fixed circle.

Clause 19. The computing system of any of clauses 14-18, wherein the input comprises a multi-touch gesture including a pinch-in gesture and a pinch-out gesture detected by the input device, the multi-touch gesture having a size defined by a distance between two input points of the pinch gesture.

Clause 20. A computer-readable storage medium comprising instructions that, when executed, configure one or more processors of a computing device to: output, for display at a display device, a graphical user interface comprising a graphical zoom indicator associated with a zoom operation of a camera, wherein the graphical zoom indicator includes an inner fixed circle, an outer fixed circle, and an adjustable circle; receive an indication of an input detected at an input device operatively coupled to the computing device; determine, based at least in part on the indication of the input, an adjustment to a zoom level of the zoom operation of the camera; and update, based at least in part on the adjustment to the zoom level of the zoom operation of the camera, the graphical user interface to modify a size of the adjustable circle based at least in part on the adjustment to the zoom level of the zoom operation of the camera.

Clause 21. The computing system of clause 14, further comprising means for performing any of the methods of clauses 1-13.

Clause 22. A computer-readable storage medium encoded with instructions for causing one or more programmable processors to perform any of the methods recited by clauses 1-13.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method, comprising:

outputting, by a computing device, for display at a display device, a graphical user interface comprising a graphical zoom indicator associated with a zoom operation of a camera, wherein the graphical zoom indicator includes an inner fixed circle, an outer fixed circle, and an adjustable circle, wherein:

the inner fixed circle, the outer fixed circle, and the adjustable fixed circle are concentric circles, the diameter of the adjustable fixed circle is greater than or equal to the diameter of the inner fixed circle, the diameter of the adjustable fixed circle is less than or equal to the diameter of the outer fixed circle, a size of the inner fixed circle defines a minimum zoom level of the zoom operation of the camera, a size of the outer fixed circle defines a maximum zoom level of the zoom operation of the camera, and a size of the adjustable circle defines a current zoom level of the zoom operation of the camera;

receiving, by the computing device, an indication of a gesture detected at an input device operatively coupled to the computing device;

determining, by the computing device, based at least in part on a feature of the gesture, an adjustment to the current zoom level of the zoom operation of the camera; and updating, by the computing device, based at least in part on the adjustment to the current zoom level of the zoom operation of the camera, the graphical user interface to modify the size of the adjustable circle based at least in part on the adjustment to the current zoom level of the zoom operation of the camera.

2. The method of claim 1, wherein the feature of the gesture comprises a size of the gesture, the size of the gesture being defined by a distance between two input points of the gesture, the method further comprising responsive to detecting an amount of change to the size of the gesture detected by the input device, modifying, by the computing device, the size of the adjustable circle by an amount of size that is proportionate to the amount of change to the size of the gesture.

3. The method of claim 1, wherein:

the feature of the gesture comprises a size of the gesture, the size of the gesture being defined by a distance between two input points of the gesture, and determining the adjustment to the current zoom level of the zoom operation of the camera further comprises responsive to detecting an increase to the size of the gesture detected by the input device, increasing, by the computing device, the current zoom level of the zoom operation of the camera.

4. The method of claim 1, wherein:

the feature of the gesture comprises a size of the gesture, the size of the gesture being defined by a distance between two input points of the gesture, and determining the adjustment to the current zoom level of the zoom operation of the camera further comprises responsive to detecting a decrease to a size of the gesture detected by the input device, decreasing, by the computing device, the current zoom level of the zoom operation of the camera.

5. The method of claim 1, wherein the gesture comprises a multi-touch gesture, and the feature of the gesture comprises a size of the multi-touch gesture being defined by a distance between two input points of the multi-touch gesture.

6. The method of claim 1, wherein the adjustment to the current zoom level of the zoom operation of the camera comprises at least one of an increase to the current zoom level and a decrease to the current zoom level of the zoom operation of the camera.

7. The method of claim 1, wherein:

the graphical zoom indicator is output for display at the display device being centered at a first location of the display device, the gesture is detected at a location of the input device corresponding to a second location of the display device, and the method further comprising responsive to receiving the indication of the gesture, outputting, by the computing device, for display at the display device, the graphical zoom indicator being centered at the second location of the display device.

8. The method of claim 1, further comprising outputting, by the computing device, for display at the display device, a graphical indication of a current zoom level of the camera within the inner circle.

9. The method of claim 1, wherein the adjustable circle is output for display at a region of the display device, the region being defined by an area outside of the inner fixed circle and an area inside the outer fixed circle.

10. The method of claim 1, wherein:

the gesture comprises a pinch gesture, the feature of the gesture comprises a size of the gesture, and determining the adjustment to the current zoom level of the zoom operation of the camera comprises responsive to determining that the size of the pinch gesture is greater than or equal to the diameter of the outer fixed circle, determining, by the computing device, that the current zoom level of the zoom operation of the camera corresponds to a maximum zoom level.

11. The method of claim 1, wherein:

the gesture comprises a pinch gesture, the feature of the gesture comprises a size of the gesture, and determining the adjustment to the current zoom level of the zoom operation of the camera comprises responsive to determining that the size of the pinch gesture is less than or equal to the diameter of the inner fixed circle, determining, by the computing device, that the current zoom level of the zoom operation of the camera corresponds to a minimum zoom level.

12. A computing system comprising:
an input device;
a display device;
a camera;
at least one processor; and
at least one module operable by the at least one processor to:
output, for display at the display device, a graphical user interface comprising a graphical zoom indicator associated with a zoom operation of the camera, wherein the graphical zoom indicator includes an inner fixed circle, an outer fixed circle, and an adjustable circle, wherein:
the inner fixed circle, the outer fixed circle, and the adjustable fixed circle are concentric circles,
the diameter of the adjustable fixed circle is greater than or equal to the diameter of the inner fixed circle,
the diameter of the adjustable fixed circle is less than or equal to the diameter of the outer fixed circle,
a size of the inner fixed circle defines a minimum zoom level of the zoom operation of the camera,
a size of the outer fixed circle defines a maximum zoom level of the zoom operation of the camera, and
a size of the adjustable circle defines a current zoom level of the zoom operation of the camera;
receive an indication of a gesture detected at the input device;
determine, based at least in part on a feature of the gesture, an adjustment to the current zoom level of the zoom operation of the camera; and
update, based at least in part on the adjustment to the current zoom level of the zoom operation of the camera, the graphical user interface to modify the size of the adjustable circle based at least in part on the adjustment to the current zoom level of the zoom operation of the camera.

13. The computing system of claim 12, wherein:
the feature of the gesture comprises a size of the gesture, the size of the gesture being defined by a distance between two input points of the gesture, and
the at least one module is further operable by the at least one processor to responsive to detecting an amount of change to the size of the gesture detected by the input device, modifying, by the computing device, the size of the adjustable circle by an amount of size that is proportionate to the amount of change to the size of the gesture.

14. The computing system of claim 12, wherein:
the feature of the gesture comprises a size of the gesture, the size of the gesture being defined by a distance between two input points of the gesture, and
the at least one module is further operable by the at least one processor to responsive to detecting an increase to the size of the gesture detected by the input device, increase the current zoom level of the zoom operation of the camera.

15. The computing system of claim 12, wherein:
the feature of the gesture comprises a size of the gesture, the size of the gesture being defined by a distance between two input points of the gesture, and
the at least one module is further operable by the at least one processor to responsive to detecting a decrease to the size of the gesture detected by the input device, decrease the current zoom level of the zoom operation of the camera.

16. The computing system of claim 12, wherein the gesture comprises a multi-touch gesture including a pinch-in gesture or a pinch-out gesture detected by the input device, and the feature of the gesture comprises a size of the multi-touch gesture being defined by a distance between two input points of the pinch-in gesture or the pinch-out gesture.

17. A non-transitory computer-readable storage medium comprising instructions that, when executed, configure one or more processors of a computing device to:
output, for display at a display device, a graphical user interface comprising a graphical zoom indicator associated with a zoom operation of the camera, wherein the graphical zoom indicator includes an inner fixed circle, an outer fixed circle, and an adjustable circle, wherein:
the inner fixed circle, the outer fixed circle, and the adjustable fixed circle are concentric circles,
the diameter of the adjustable fixed circle is greater than or equal to the diameter of the inner fixed circle,
the diameter of the adjustable fixed circle is less than or equal to the diameter of the outer fixed circle,
a size of the inner fixed circle defines a minimum zoom level of the zoom operation of the camera,
a size of the outer fixed circle defines a maximum zoom level of the zoom operation of the camera, and
a size of the adjustable circle defines a current zoom level of the zoom operation of the camera;
receive an indication of a gesture detected at an input device;
determine, based at least in part on a feature of the gesture, an adjustment to the current zoom level of the zoom operation of the camera; and
update, based at least in part on the adjustment to the current zoom level of the zoom operation of the camera, the graphical user interface to modify the size of the adjustable circle based at least in part on the adjustment to the current zoom level of the zoom operation of the camera.

18. The method of claim 5, wherein the multi-touch gesture comprises a pinch-in gesture or a pinch-out gesture, and the feature of the gesture comprises a maximum size of the pinch-out gesture or a minimum size of the pinch-in gesture.

* * * * *